United States Patent
Mao

(10) Patent No.: US 10,929,921 B1
(45) Date of Patent: Feb. 23, 2021

(54) INSTANT MATCHING OF DATA FOR ACCOUNTING BASED ON EMAIL AND BANK SCRAPING

(71) Applicant: Joseph Wenhow Mao, Sunnyvale, CA (US)

(72) Inventor: Joseph Wenhow Mao, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 929 days.

(21) Appl. No.: 14/528,042

(22) Filed: Oct. 30, 2014

(51) Int. Cl.
*G06Q 40/02* (2012.01)
*G06Q 20/10* (2012.01)

(52) U.S. Cl.
CPC ............. *G06Q 40/02* (2013.01); *G06Q 20/10* (2013.01)

(58) Field of Classification Search
CPC ...... G06Q 20/10; G06Q 20/102; G06Q 20/04; G06Q 40/00; G06Q 40/02
USPC .......................................................... 705/39
See application file for complete search history.

(56) References Cited

U.S. PATENT DOCUMENTS

| | | | | |
|---|---|---|---|---|
| 7,720,760 B1* | 5/2010 | Cook | | G06Q 20/02 |
| | | | | 705/40 |
| 8,538,827 B1* | 9/2013 | Dryer | | G06Q 30/00 |
| | | | | 705/26.1 |
| 2005/0267823 A1* | 12/2005 | Hartmann | | G06Q 40/12 |
| | | | | 705/30 |
| 2012/0030104 A1* | 2/2012 | Huff | | G06Q 30/06 |
| | | | | 705/42 |
| 2012/0179609 A1* | 7/2012 | Agarwal | | G06Q 20/042 |
| | | | | 705/44 |
| 2012/0310828 A1* | 12/2012 | Hu | | G06O 20/108 |
| | | | | 705/44 |
| 2013/0124419 A1* | 5/2013 | Riehl | | G06Q 20/10 |
| | | | | 705/45 |
| 2014/0006275 A1* | 1/2014 | Hanson | | G06Q 20/3223 |
| | | | | 705/41 |
| 2014/0244453 A1* | 8/2014 | Rephlo | | G06Q 30/04 |
| | | | | 705/30 |
| 2014/0358799 A1* | 12/2014 | Kingston | | G06Q 30/016 |
| | | | | 705/304 |
| 2015/0073959 A1* | 3/2015 | Connors | | G06Q 40/00 |
| | | | | 705/35 |
| 2016/0019657 A1* | 1/2016 | Mande | | G06Q 40/12 |
| | | | | 705/30 |

OTHER PUBLICATIONS

Antoinette Alexander, The Art of Aggregation/Account aggregation gets a new life, Aug. 2008, Accounting Technology 24.7:30, SourceMedia, Inc. (4 pages) (Year: 2008).*

* cited by examiner

*Primary Examiner* — Benjamin S Brindley
(74) *Attorney, Agent, or Firm* — Ferguson Braswell Fraser Kubasta PC

(57) ABSTRACT

A method comprising receiving real time data associated with a transaction, accessing, from an online bank account after receiving the real time data, processed data associated with the transaction, matching the real time data with the processed data, and displaying an alert when the processed data and the real time data are inconsistent.

20 Claims, 4 Drawing Sheets

INSTANT MATCHING OF DATA FOR
ACCOUNTING BASED ON EMAIL AND
BANK SCRAPING

BACKGROUND

Tracking accounting and banking data is of critical importance to individuals and businesses alike, as banks have been known to make the occasional error and may be delayed in receiving information. However, when tracking accounting and banking data on a detailed level, many banks fail to provide specific enough details for every transaction.

SUMMARY OF INVENTION

In general, in one aspect, the invention relates to a method. The method comprising: receiving, via a financial management application (FMA) executing on a computer processor, real time data associated with a transaction; accessing, via the FMA from an online bank account after receiving the real time data, processed data associated with the transaction; matching, via the FMA, the real time data with the processed data; and displaying, via the FMA, an alert when the processed data and the real time data are inconsistent.

In general, in one aspect, the invention relates to a non-transitory computer readable medium (CRM) storing instructions. The instructions, when executed, are configured to: receive real time data associated with a transaction; access, from an online bank account after receiving the real time data, processed data associated with the transaction; match the real time data with the processed data; and display an alert when the processed data and the real time data are inconsistent.

In general, in one aspect, the invention relates to a system. The system comprising: an online banking service, comprising an online bank account, and configured to: provide processed data associated with a transaction; and a financial management application (FMA), executing on a computer processor and configured to: receive real time data associated with the transaction; access, from the online bank account after receiving the real time data, processed data associated with the transaction; match the real time data with the processed data; and display an alert when the processed data and the real time data are inconsistent.

Other aspects and advantages of the invention will be apparent from the following description and the appended claims.

DETAILED DESCRIPTION

Figure 1:
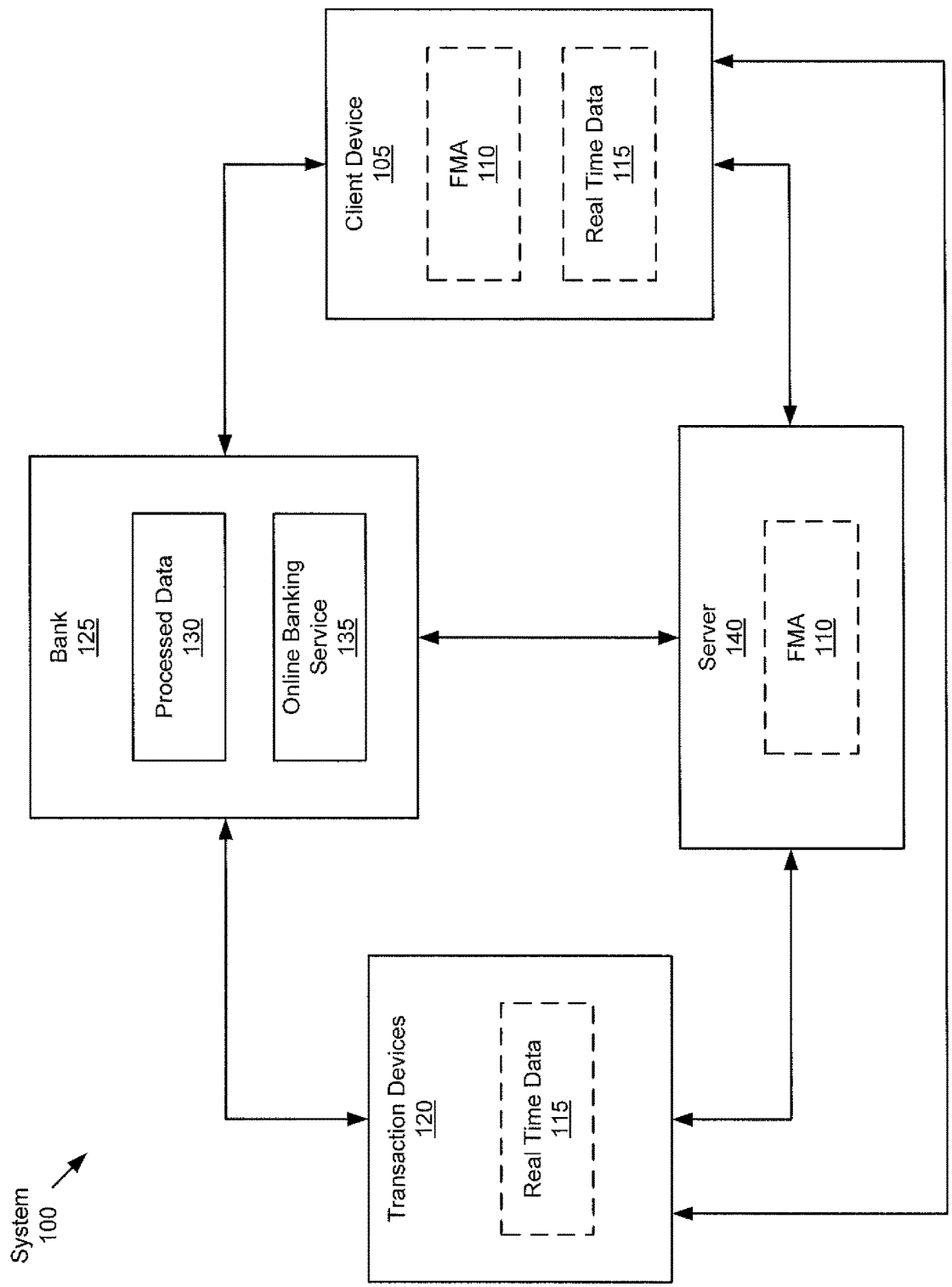
FIG. 1 shows a schematic diagram in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details, In other instances, well-known features have not been described in detail to avoid unnecessarily complicating the description.

In general, embodiments of the invention provide a method, computer readable medium, and system for instant matching of data for accounting. Specifically, real time data associated with a transaction is received. Subsequently, processed data for the same transaction is accessed. The real time data is them matched with the processed data, and an alert is displayed when the processed data and the real time data are inconsistent.

FIG. 1 shows system (100), which includes client device (105), financial management application (FMA) (110), real time data (115), transaction devices (120), bank (125), processed data (130), online banking service (135), and server (140). To begin, real time data (115) and processed data (130) will be described. Real time data (115) is data that is created at the time of a transaction. In other words, real time data (115) has not yet been processed. For example, if the transaction is depositing a check, then an image of the check that is used to deposit the check (i.e., a user takes a picture of a check, and sends the picture to his or her bank to deposit the check, etc.) is real time data. Continuing with that example, the check, once deposited, has to be cleared and processed by the bank, with funds moving between various accounts. Typically, this process takes anywhere from hours to a couple of days, Once this processing is completed, processed data (130) is available for access from the bank. Thus, processed data (130) is data associated with a transaction that is created during or upon the completion of the transaction (i.e., once the check has cleared and money has been transferred between the appropriate accounts). In one or more embodiments, an additional way to describe real time data (115) is that real time data (115) is data from the view point of the user, while processed data (130) is data from the view point of the bank or other financial entity. For example, consider a transaction that deposits one check for $125, a second check for $75, and withdraws $50 in cash. From the viewpoint of the user, the transaction involves 3 items, each with details that the user may want to individually account for. From the viewpoint of the bank, that transaction is simply a net deposit of $150, and no further detail may be provided.

Returning to real time data (115), real time data (115) may relate to any kind of transaction including, but not limited to: depositing checks, depositing cash, withdrawing cash, purchasing an item, credit card transactions, debit card transactions, a combination of the above, or any other suitable kind of transaction. Real time data (115) may be received in any form now known or later developed including, but not limited to: images, text messages, e-mails, online data, etc. In one or more embodiments, real time data (115) may come from any suitable source such as client device (105), transaction devices (120), and/or online banking service (135). The device and/or service that provide real time data (115) may be different from the device and/or service that provide processed data (130). Alternatively, in one or more embodiments, the device and/or service that provide real time data (115) may also provide processed data (130). In one or more embodiments, real time data (115) may include any data related to a transaction including, but not limited to: payee, payor, amount, date, time, location, check number, reference number, item number, item(s) purchased, store number, etc. In one or more embodiments, real time data (115) may be formatted in any manner now known or later developed.

In one or more embodiments, processed data (130) relates to the same transaction as the associated real time data (115), which may include, but is not limited to: depositing checks, depositing cash, withdrawing cash, purchasing an item, credit card transactions, debit card transactions, a combination of the above, or any other suitable kind of transaction. Processed data (130) may be received in any form now known or later developed. In one or more embodiments, processed data is received from an online banking service, or other similar service. Processed data (130) may include any data related to the transaction including, but not limited to: payee, payor, amount, date, time, location, check number, reference number, item number, item(s) purchased, store number, etc. Specifically, processed data (130) may contain slightly different data than real time data (115), and typically contains a lower level of detail than real time data (115). For example, if a transaction involved depositing 3 checks, rather than showing data relating to each individual check, processed data (130) may include the sum total of the three checks, with or without other data. In one or more embodiments, processed data (130) may be formatted in any manner now known or later developed.

In one or more embodiments, client device (105) may be any computing device including, but not limited to: a smart phone, a cell phone, a tablet, a desktop computer, a laptop computer, a handheld gaming device, a watch, etc. Client device (105) may have many different hardware components including, but not limited to: display screen(s), touch screen(s), processor(s), memory, hard drive(s), input devices, etc. Client device (105) may include functionality to receive e-mails, text messages, take and/or receive pictures or other images, record and/or receive video, send and/or receive data, and/or any other functionality utilized by financial management application (FMA) (110). In one or more embodiments, some of the above mentioned functionality may be from one or more applications executed by client device (105), such as FMA (110). Client device (105) is communicatively connected to transaction devices (120), bank (125), and/or server (140) via one or more wired and/or wireless connections, such as the Internet.

In one or more embodiments, FMA (110) is an application that aids a user in managing his or her (or a business's) financial and/or accounting data. In one or more embodiments, FMA (110) may be a thick client application, where most of the processing is performed locally. Alternatively, FMA (110) may be a thin client application, where most of the processing is not performed locally. FMA (110) may be located on client device (105) and/or on server (140), or on any other suitable device (not shown). FMA (110) includes functionality to receive real time data, access online banking services, match real time data with processed data, display alerts, and other functionality.

In one or more embodiments, FMA (110) includes functionality to receive real time data (115) in any manner now known or later developed. Specifically, FMA (110) may receive the real time data in a text message, e-mail, image, etc. FMA (110) may then extract transaction data from the text message, e-mail, image, etc., using, for example, Optical Character Recognition (OCR), or other suitable operation. As another example, if the real time data is received in a text form (i.e., e-mail, text message, etc.) then filtering may be performed, such as using keywords, to identify the specific transaction data needed. The transaction data may include, for example: payee, payor, amount, date, time, location, check number, items purchased, store number, etc. FMA (110) also includes functionality to store real time data (115) in any manner now known or later developed. Specifically, the real time data may be stored into a spreadsheet, a custom data structure, or other suitable form for accounting.

In one or more embodiments, FMA (110) includes functionality to access online banking service (135) in any manner now known or later developed. Specifically, online banking services may be accessed for any bank that enables users to access their bank data online. The online banking service may require a username and/or password to login. Once the FMA (110) has accessed the online banking service, screen scraping or other suitable methods may be used to gather the appropriate processed data (130), FMA (110) also includes functionality to store processed data (130) in any manner now known or later developed. Specifically, the processed data may be stored into a spreadsheet, a custom data structure, or other suitable form for accounting.

In one or more embodiments, FMA (110) includes functionality to match real time data with processed data in any manner now known or later developed. The real time data and processed data may be matched in a variety of ways. For example, FMA (110) may know the reporting tendencies of many different banks, and may use that knowledge to influence how the processed data is matched to the real time data. For example, if Bank A uses format A for processed data which lumps all deposits and withdraws together into a single amount, then the date of checks with a summation of their amounts may be used to match the real time data to the processed data. As another example, processed data may be searched for a particular item, such as a check number, amount, or other identifier that may be used to match the processed data and the real time data. It will be apparent to one of ordinary skill in the art, having the benefit of this disclosure, that there are many ways in which to match real time data to the corresponding processed data and, as such, the invention should not be limited to the above examples.

Once matched, FMA (110) may ensure that the processed data and real time data are the same. In other words, FMA (110) may double check that the bank did not make any mistakes when processing the transaction(s). If there is a potential error, FMA (110) includes functionality to display alerts in any manner now known or later developed. The alert may be displayed as a popup, a sound, a text message, an e-mail, a visual signal, or other suitable method.

In one or more embodiments, transaction devices (120) may be a variety of devices capable of providing real time data (115) including, but not limited to: Automated Teller Machines (ATMs), Point of Sale (POS) terminals, online checkouts. In one or more embodiments, client device (105) may act as a transaction device. Transaction devices (120) may be associated with bank (125) or other financial entity. Transaction devices (120) may be communicatively connected to client device (105), bank (125), and/or server (140) using a wired and/or wireless connection, such as the Internet. It will be apparent to one of ordinary skill in the art, having the benefit of this disclosure, that there are many different types of transaction devices and, as such, the invention should not be limited to the above examples.

In one or more embodiments of the invention, bank (125) is a bank or other financial entity. Bank (125) may provide a variety of services to members, such as checking accounts, savings accounts, loans, mortgages, credit cards, debit cards, etc. In one or more embodiments, bank (125) may provide online access to a member's financial information via online banking service (135). The online bank service (135) may require a username, password, or other security measures before allowing access. Online banking service (135) may have many different functionalities, such as transferring money, paying bills, requesting quotes, etc. In one or more embodiments, online banking service (135) allows access to processed data (130). Bank (125) may be communicatively connected client device (105), transaction devices (120), and/or server (140) using wired and/or wireless connections, such as the Internet.

Figure 2:
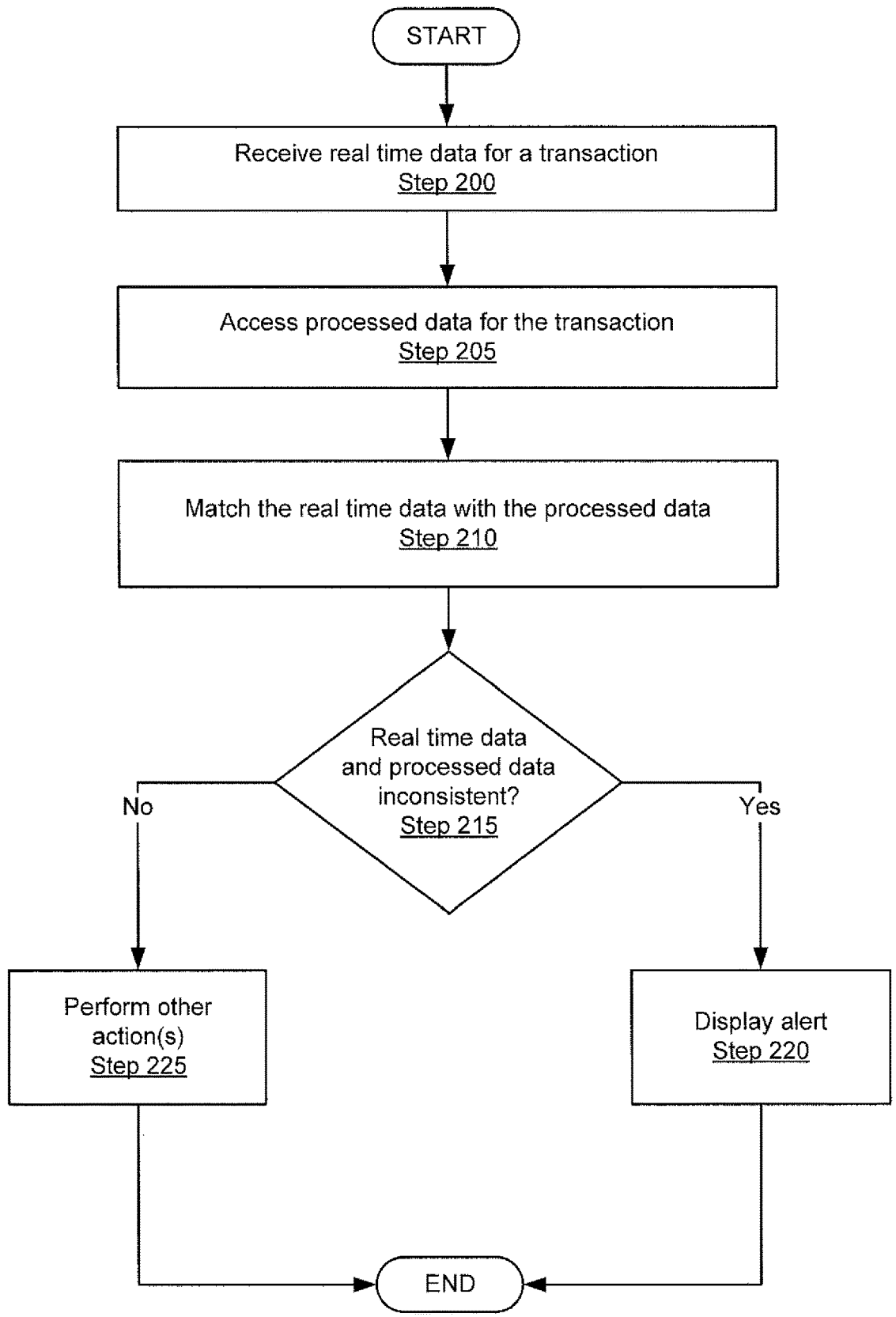
FIG. 2 shows a flowchart of a method in accordance with one or more embodiments of the invention.

FIG. 2 shows a flowchart of a method for instant matching of data for accounting. While the various steps in this flowchart are presented and described sequentially, one of ordinary skill in the art will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 2 should not be construed as limiting the scope of the invention.

In Step 200, real time data is received for a transaction, in accordance with one or more embodiments. The real time data may be received in any suitable format, such as an image, a text message, an e-mail, etc. Depending on the format of the real time data, specific transaction data items may need to be extracted, such as payee, payor, amount, date, time, location, check number, items purchased, etc. The extraction may be performed using any manner now known or later developed, such as OCR, scraping, filtering, keyword searching, etc. In one or more embodiments, the real time data may be received from any suitable source, such as an ATM, POS terminal, computer, smartphone, etc. The real time data may be from the viewpoint of the user which, when matched with the processed data, is able to provide a complete picture of a transaction and ensure the accuracy of the transaction. After receiving the real time data, the real time data may be stored in any manner now known or later developed.

In Step 205, processed data for the transaction is accessed, in accordance with one or more embodiments. The processed data may be accessed from a bank or other financial entity using, for example, an online banking service. The processed data may contain many different specific transaction data items, such as payee, payor, amount, date, time, location, check number, items purchased, etc. Typically, the processed data is at a lower level of detail than the real time data, show a sum of multiple deposits lumped together, rather than the amount of each individual deposit making up a single transaction, for example. After access the processed data, the processed data may be stored in any manner now known or later developed.

In Step 210, the real time data is matched to the processed data, in accordance with one or more embodiments. The real time data may be matched to the processed data in any suitable manner. For example, the data may be filtered and/or searched to identify common items, such as a check number, transaction number, amount, date, etc. Alternatively, the processed data may be in a format standardized by the providing bank and, if that format is known, the data may be matched using that knowledge. After matching, the previously stored data may be updated and/or deleted as needed.

In Step 215, a determination is made whether the real time data and the processed data are inconsistent, in accordance with one or more embodiments. The real time data and the processed data may be inconsistent when, for example, the amount of the transactions is not the same, or any other suitable standard. The user may be able to set a tolerance or threshold for when the real time data is too inconsistent with the processed data, based on any data item or other available standard. If the data is consistent, the method proceeds to Step 225. If the data is inconsistent, then the method proceeds to Step 220.

In Step 220, an alert is displayed, in accordance with one or more embodiments. The alert may be displayed in any manner now known or later developed. The alert may be a sound, a visual cue, a text message, an e-mail, etc. The alert may indicate that the particular transaction involved may have an error or errors, and that the user should more closely inspect that particular transaction. It will be apparent to one of ordinary skill in the art, having the benefit of this disclosure, that there are many ways to display an alert and, as such, the invention should not be limited to the above examples.

In Step 225, other actions are performed, in accordance with one or more embodiments. Any suitable action may be taken once the real time data has been matched with the processed data, such as creating invoices, paying taxes, paying employees, balancing the books, budgeting, performing other accounting tasks, etc.

The following section describes various examples of the invention. The examples are included to aid in the understanding of the invention and are not intended to limit the scope of the invention.

Figure 3:
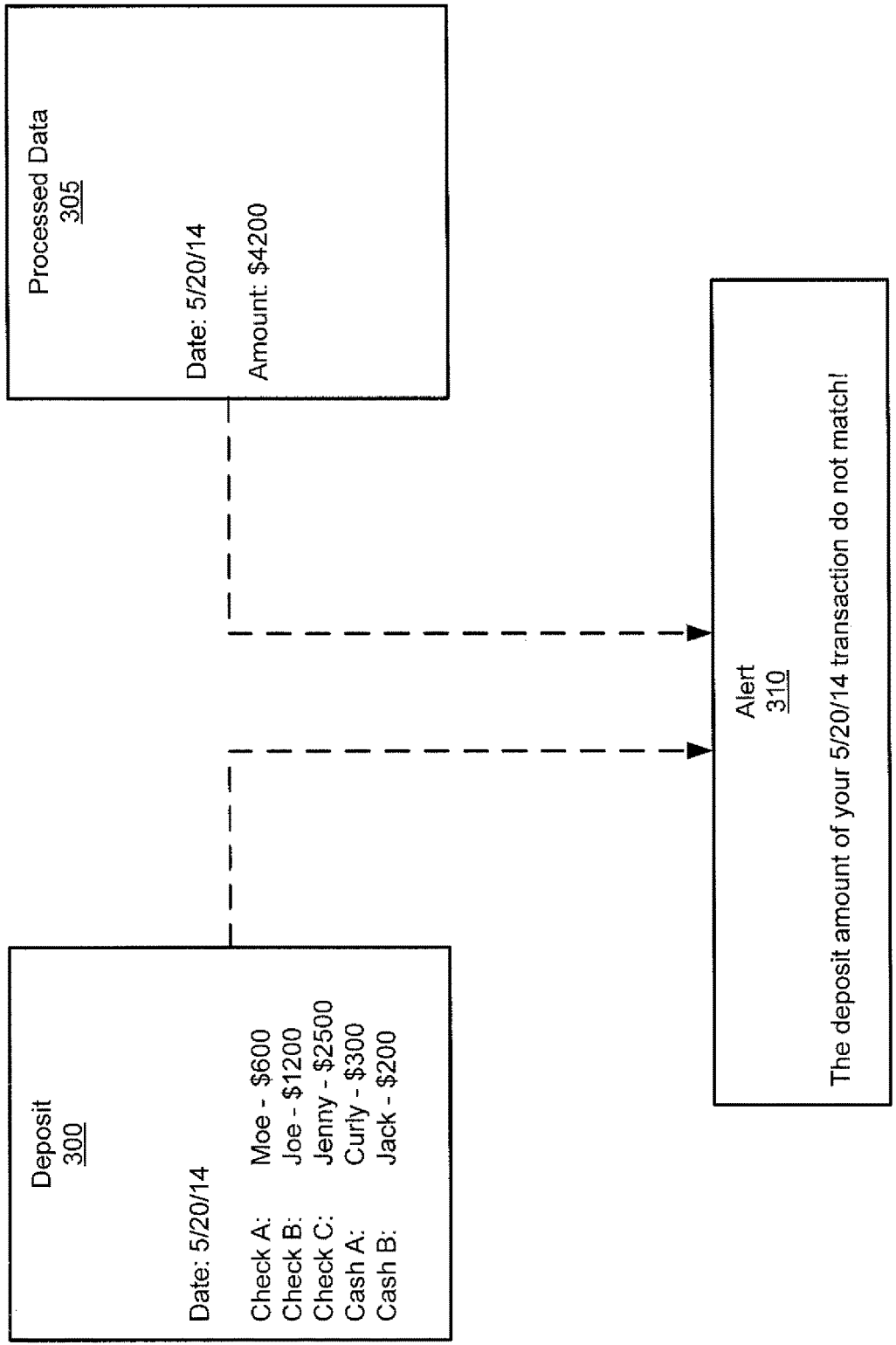
FIG. 3 shows an example in accordance with one or more embodiments of the invention.

FIG. 3 shows an example of instant matching of data for accounting. Specifically, in FIG. 3, Larry is depositing some checks and cash at his local bank. In the process of doing so, Larry takes a picture of deposit (300), which identifies the different items involved in the deposit. Deposit (300) includes three checks, and two cash deposits, for a total of $4800. This information, in addition to other information, is extracted from the picture using OCR. The information is stored by Larry's FMA for later matching once processed data is available. Importantly, the picture was taken at the time of the deposit, and represents the transaction from Larry's viewpoint. After taking the picture, Larry completes his deposit and goes about his day.

Subsequently, Larry's bank makes processed data (305) available via the bank's online banking service. Larry's FMA automatically accesses the online banking service, and downloads processed data (305). The processed data (305) is matched to the real time data from deposit (300) based on the date of the transaction: May 20, 2014. However, when the amount of the transaction is compared using the real time data from deposit (300) and the processed data (305) the amount is inconsistent. Specifically, the amount from processed data (305) is $600 less than the amount from deposit (300). Thus, alert (310) is sent to Larry telling him that the deposit amounts on his deposit from May 20, 2014 do not match! Larry is then able to more closely investigate the issue and determine that the bank did not process Check A from Moe, and is able to take the proper steps to resolve this issue.

Figure 4:
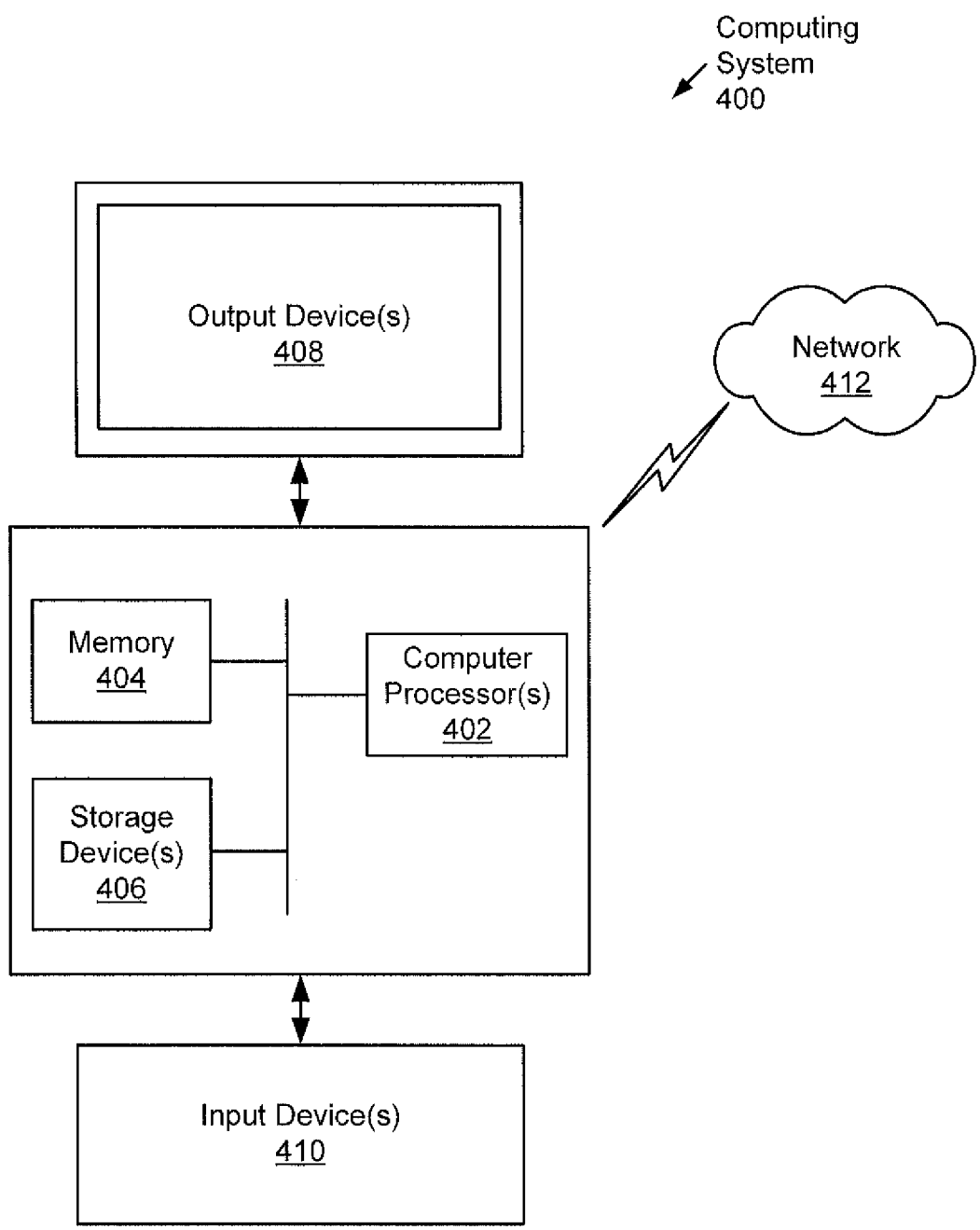
FIG. 4 shows a computer system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the faun of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
    receiving, over a network via a financial management application (FMA) executing on a server, real time data associated with a transaction, wherein real time data is data created at the time of the transaction,
        wherein the FMA comprises an application that aids a user in managing financial data of the user, and further comprises functionality to access online banking services including an online bank account associated with the user,
        wherein the real time data further comprises an email generated by the FMA, and
        wherein the email contains data describing a plurality of transactions entered into the FMA as a result of the transaction;
    accessing, over the network via the FMA from the online bank account after receiving the real time data, processed data associated with the transaction, wherein processed data is data created during or upon completion of the transaction,
        wherein the processed data comprises a combination of the plurality of transactions, and
        wherein the processed data comprises a lower level of detail than the real time data, the lower level of detail comprising the plurality of transactions being summed together;
    gathering the processed data using screen scraping of the processed data to identify a feature of the combination of the plurality of transactions;
    matching, via the FMA, the real time data with the processed data by verifying whether the plurality of transactions is consistent with the feature of the combination of the plurality of transactions; and
    displaying, via a popup in the FMA, an alert when the processed data and the real time data are inconsistent as determined by a tolerance specified by a user of the FMA, wherein the processed data and the real time data are inconsistent when the plurality of transactions fails to match the feature of the combination of the plurality of transactions within the tolerance.

2. The method of claim 1, wherein the transaction comprises a first item and a second item, wherein the transaction is a deposit, wherein the first item is a first check comprising a first amount, a first payee, and a first date; and wherein the second item is a second check comprising a second amount, a second payee, and a second date.

3. The method of claim 2, wherein the processed data comprises a third amount and a third date, and wherein the processed data comprises only a total of the first check and the second check.

4. The method of claim 3, wherein the real time data is received as an image.

5. The method of claim 4, further comprising:
    extracting, from the image, the first amount, the first payee, the first data, the second amount, the second payee, and the second date.

6. The method of claim 5, wherein matching further comprises:
    comparing the third amount to a sum of the first amount and the second amount wherein the real time data matches the processed data only if the third amount matches the sum of the first amount and the second amount.

7. The method of claim 1, wherein the real time data is received as an e-mail.

8. A non-transitory computer readable medium (CRM) storing instructions which, when executed, are configured to:
    receive at a server over a network, via a financial management application (FMA), real time data associated with a transaction, wherein real time data is data created at the time of the transaction, wherein the FMA comprises an application that aids a user in managing financial data of the user, and further comprises functionality to access online banking services including an online bank account associated with the user, wherein the real time data further comprises an email generated by the FMA, and wherein the email contains data describing a plurality of transactions entered into the FMA as a result of the transaction;

access, over the network from the online bank account after receiving the real time data, processed data associated with the transaction, wherein processed data is data created during or upon completion of the transaction;

wherein the processed data comprises a combination of the plurality of transactions, and wherein the processed data comprises a lower level of detail than the real time data, the lower level of detail comprising the plurality of transactions being summed together;

gather the processed data using screen scraping of the processed data to identify a feature of the combination of the plurality of transactions;

match the real time data with the processed data by verifying whether the plurality of transactions is consistent with the feature of the combination of the plurality of transactions; and display via a popup an alert when the processed data and the real time data are inconsistent as determined by a tolerance specified by a user of the FMA wherein the processed data and the real time data are inconsistent when the plurality of transactions fails to match the feature of the combination of the plurality of transactions within the tolerance.

9. The non-transitory CRM of claim 8, wherein the transaction comprises a first item and a second item, wherein the transaction is a deposit, wherein the first item is a first check comprising a first amount, a first payee, and a first date; and wherein the second item is a second check comprising a second amount, a second payee, and a second date.

10. The non-transitory CRM of claim 9, wherein the processed data comprises a third amount and a third date, and wherein the processed data comprises only a total of the first check and the second check.

11. The non-transitory CRM of claim 10, wherein the real time data is received as an image.

12. The non-transitory CRM of claim 11, the instructions further configured to:
extract, from the image, the first amount, the first payee, the first data, the second amount, the second payee, and the second date.

13. The non-transitory CRM of claim 12, wherein matching further comprises:
comparing the third amount to a sum of the first amount and the second amount wherein the real time data matches the processed data only if the third amount matches the sum of the first amount and the second amount.

14. The non-transitory CRM of claim 8, wherein the real time data is received as an e-mail.

15. A system comprising:
an online banking service, comprising an online bank account associated with a user, and configured to:
provide over a network processed data associated with a transaction, wherein processed data is data created during or upon completion of the transaction, wherein the processed data comprises a combination of a plurality of transactions, and wherein the processed data comprises a lower level of detail than individual ones of the plurality of transactions, the lower level of detail comprising the plurality of transactions being summed together; and a financial management application (FMA), wherein the FMA comprises an application that aids a user in managing financial data of the user, and further comprises functionality to access the online banking services including the online bank account associated with the user, the FMA executing on a server and configured to:

receive over the network real time data associated with the transaction,
wherein real time data is data created at the time of the transaction,
wherein the real time data further comprises an email generated by the FMA, and
wherein the email contains data describing individual ones of the plurality of transactions entered into the FMA as a result of the transaction;

access, from the online bank account after receiving the real time data, the processed data associated with the transaction;

gather the processed data using screen scraping of the processed data to identify a feature of the combination of the plurality of transactions;

match the real time data with the processed data by verifying whether the plurality of transactions is consistent with the feature of the combination of the plurality of transactions; and display, via a popup, an alert when the processed data and the real time data are inconsistent as determined by a tolerance specified by a user of the FMA, wherein the processed data and the real time data are inconsistent when the plurality of transactions fails to match the feature of the combination of the plurality of transactions within the tolerance.

16. The system of claim 15, wherein the transaction comprises a first item and a second item, wherein the transaction is a deposit, wherein the first item is a first check comprising a first amount, a first payee, and a first date; and wherein the second item is a second check comprising a second amount, a second payee, and a second date, and wherein the processed data comprises only a total of the first check and the second check.

17. The system of claim 16, wherein the processed data comprises a third amount and a third date.

18. The system of claim 17, wherein the real time data is received as an image.

19. The system of claim 18, wherein the FMA is further configured to:
extract, from the image, the first amount, the first payee, the first data, the second amount, the second payee, and the second date.

20. The system of claim 19, wherein matching further comprises:
comparing the third amount to a sum of the first amount and the second amount wherein the real time data matches the processed data only if the third amount matches the sum of the first amount and the second amount.

* * * * *